(12) United States Patent
Brown et al.

(10) Patent No.: US 8,307,359 B1
(45) Date of Patent: Nov. 6, 2012

(54) EMBEDDED VIRTUAL STORAGE AREA NETWORK USING A VIRTUAL BLOCK NETWORK FABRIC

(75) Inventors: Jeffrey A. Brown, Shrewsbury, MA (US); Randall H. Shain, Wrentham, MA (US)

(73) Assignee: EMC Corporation, Hopkinton, MA (US)

( * ) Notice: Subject to any disclaimer, the term of this patent is extended or adjusted under 35 U.S.C. 154(b) by 1266 days.

(21) Appl. No.: 11/426,071

(22) Filed: Jun. 23, 2006

(51) Int. Cl.
*G06F 9/455* (2006.01)
(52) U.S. Cl. ............................................ 718/1
(58) Field of Classification Search .................. 718/1
See application file for complete search history.

(56) References Cited

U.S. PATENT DOCUMENTS

| | | | |
|---|---|---|---|
| 4,831,541 A * | 5/1989 | Eshel ............................. | 718/100 |
| 6,898,670 B2 | 5/2005 | Nahum | |
| 6,934,799 B2 | 8/2005 | Acharya et al. | |
| 6,961,941 B1 | 11/2005 | Nelson et al. | |
| 7,020,760 B2 | 3/2006 | Glider | |
| 7,181,744 B2 * | 2/2007 | Shultz et al. .................. | 718/104 |
| 7,213,246 B1 * | 5/2007 | van Rietschote et al. ......... | 718/1 |
| 7,302,514 B2 * | 11/2007 | Ouriel et al. ..................... | 711/6 |
| 7,581,048 B1 * | 8/2009 | Budd et al. ...................... | 710/74 |
| 7,603,670 B1 * | 10/2009 | van Rietschote ................. | 718/1 |
| 7,606,868 B1 * | 10/2009 | Le et al. .......................... | 709/211 |
| 2002/0083120 A1 * | 6/2002 | Soltis .............................. | 709/200 |
| 2004/0132532 A1 * | 7/2004 | Brosnan et al. ................ | 463/42 |
| 2004/0215749 A1 * | 10/2004 | Tsao ............................... | 709/220 |
| 2005/0114855 A1 * | 5/2005 | Baumberger ..................... | 718/1 |
| 2005/0289540 A1 * | 12/2005 | Nguyen et al. ................... | 718/1 |
| 2007/0050767 A1 * | 3/2007 | Grobman et al. ................. | 718/1 |
| 2007/0253436 A1 * | 11/2007 | Henry et al. ..................... | 370/401 |

\* cited by examiner

*Primary Examiner* — Meng An
*Assistant Examiner* — Blake Kumabe
(74) *Attorney, Agent, or Firm* — Guerin & Rodriguez, LLP; Michael A Rodriguez

(57) ABSTRACT

Described are a system and method of embedding a virtual storage area network on an electronic device. A virtual machine runs on the electronic device. The virtual machine provides a virtual storage target for responding to block storage requests from storage initiators. A virtual fabric is coupled between the virtual machine and an external storage area network (SAN). The virtual fabric routes a storage request from a storage initiator to the virtual storage target.

39 Claims, 11 Drawing Sheets

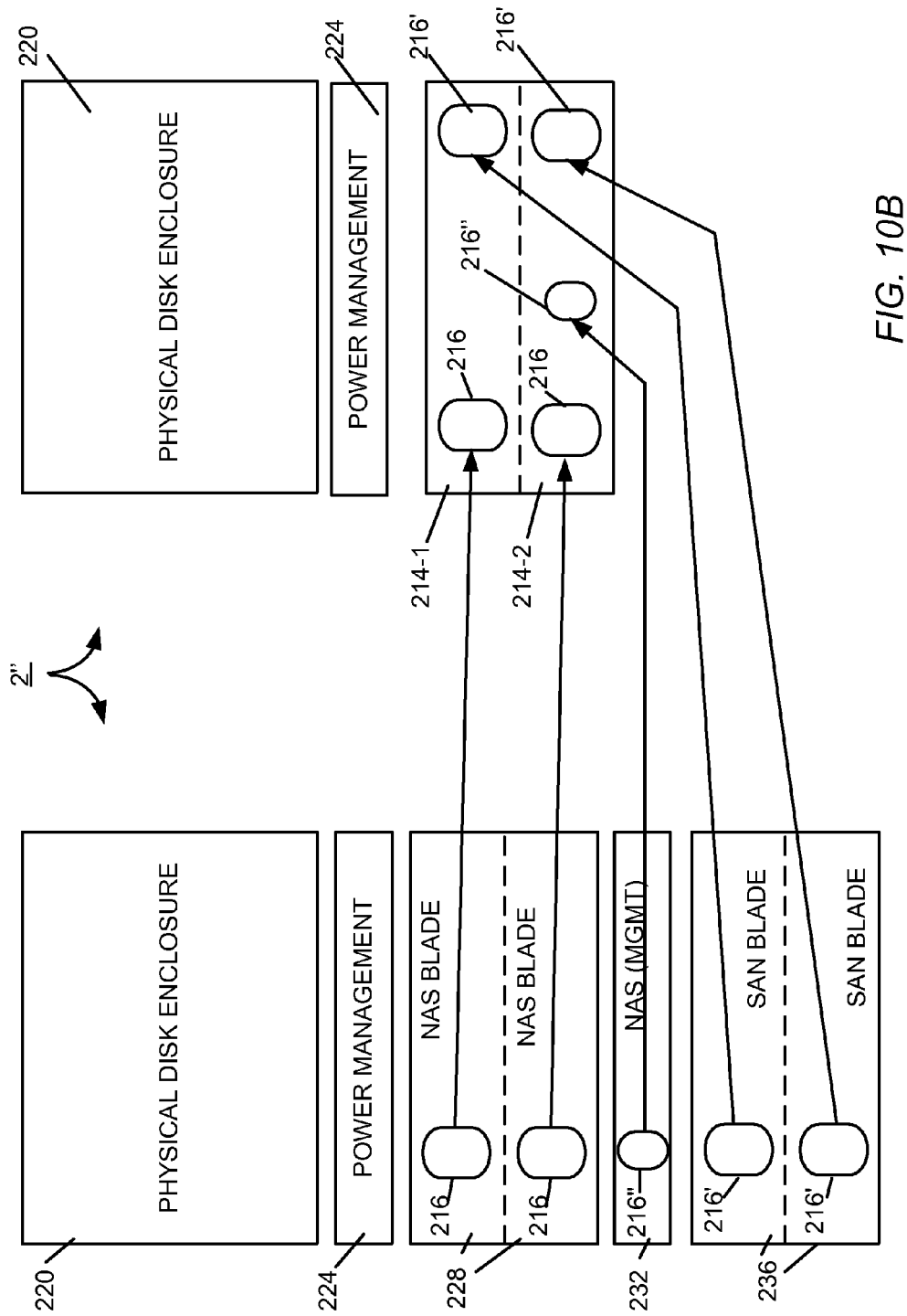

EMBEDDED VIRTUAL STORAGE AREA NETWORK USING A VIRTUAL BLOCK NETWORK FABRIC

FIELD OF THE INVENTION

The invention relates generally to storage systems and storage area networks (SANs). More particularly, the invention relates to embedding a virtual storage area network (SAN) in a server blade using a virtual block network fabric.

BACKGROUND

The use of virtualization in data center servers is becoming widespread. Generally, virtualization in a data center server describes a software abstraction that separates a storage resource and its use from the underlying physical machine. Virtual machines (VM), which are a virtualization of a physical electronic device and its hardware components, play a central role in virtualization. A virtual machine typically includes a virtual processor, virtual system memory, virtual storage, and various virtual devices. To use the virtual devices, the operating system usually utilizes standard device drivers. Operating systems executing on the virtual machine operate as though executing on the actual hardware of the physical electronic device. A layer of software is required between a virtual machine and the underlying physical hardware. This interface multiplexes access to the hardware between resident virtual machines. The interface is commonly referred to as the hypervisor.

Presently, virtualization has had limited penetration into storage system applications. Virtual machines used in storage applications currently have a limited view of disk resources on external storage area networks. Further, all traffic between storage initiators and storage targets occur "over the wire," that is, the communications pass from the storage initiator to an external storage target. Accordingly, all routing of requests from initiators to targets occurs externally (outside of the electronic devices of the initiator and of the target).

A consequence of the limited penetration of virtualization into current storage applications, which generally use a single storage stack on a single physical machine, is the inability of such storage applications to keep pace with technological advances. A single storage stack (embodied in a storage application) may have difficulty utilizing the increasing number of processor cores that are becoming available on storage systems. In addition, ports are becoming faster and more numerous. A single storage stack that operates with an increased hardware configuration becomes an increasing fault liability. Because of the heavier hardware load, the single storage stack becomes a more vulnerable single point of failure, complicating any prospects of offering quality-of-service (QOS) guarantees.

SUMMARY

In one aspect, the invention features a storage area network embedded in an electronic device housing one or more processors. The one or more processors execute program code for producing a first virtual machine on the electronic device. The first virtual machine provides a virtual storage initiator that issues storage requests to read or to write data. Execution of the program code also produces a second virtual machine on the electronic device. The second virtual machine provides a virtual storage target that responds to storage requests from the virtual storage initiator.

In another aspect, the invention features a system including an electronic device having at least one processor executing program code to produce a virtual machine. The virtual machine runs an application that provides a virtual storage target that responds to block storage requests from storage initiators. A virtual fabric is coupled between the virtual machine and a storage area network (SAN) fabric. The virtual fabric routes a storage request from a storage initiator to the virtual storage target.

In another aspect, the invention features a computer-implemented method of embedding a storage area network on an electronic device. The method comprises running a virtual machine on the electronic device. The virtual machine provides a virtual storage target for responding to storage requests from storage initiators. A virtual fabric is coupled between the virtual machine and an external storage area network (SAN). The virtual fabric routes a storage request from a storage initiator to the virtual storage target.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 10A and FIG. 10B are block diagram representations of blade consolidation.

DETAILED DESCRIPTION

Figure 1:
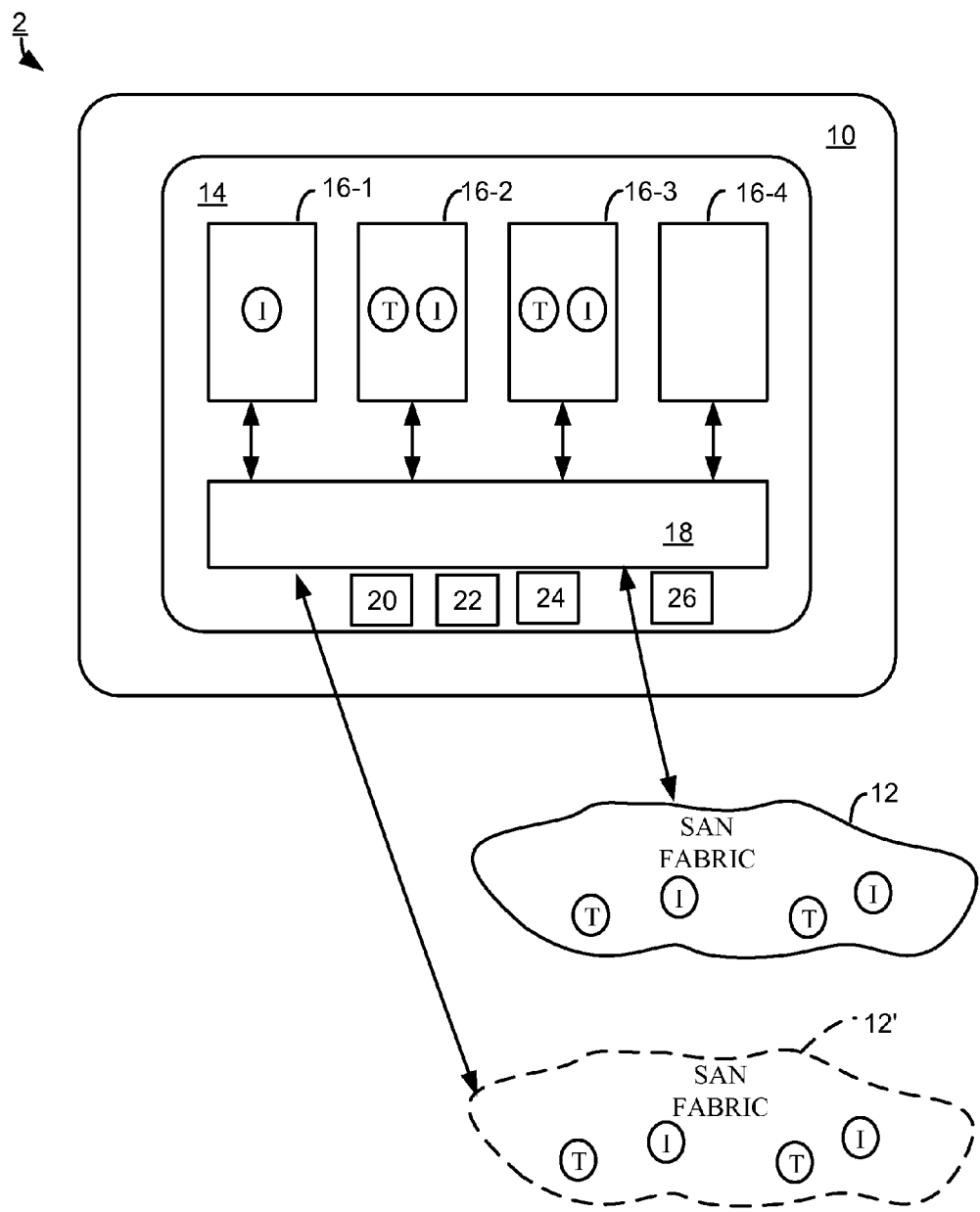
FIG. 1 is a block diagram representation of a storage-network environment including a blade server in communication with a storage area network (SAN) fabric, the blade server having a blade with a plurality of virtual machines operating thereon, each virtual machine being coupled to a virtual block network fabric.

Storage systems constructed in accordance with the invention bring a storage area network (SAN) within a virtualized computing environment. Traditionally, SANs remained external to the virtualized computing environment, and requests from virtual storage initiators operating within the virtualized environment passed "over the wire", i.e., from the hardware of the computing environment to an external SAN fabric. In accordance with the invention, virtual machines operating within the virtualized computing environment include virtual storage targets (i.e., the targets within the virtualized computing environment). Requests from virtual storage initiators operating within the virtualized computing environment can thus pass to the virtual storage targets over a virtual block network (VBN) fabric, without having to pass over the wire.

In accordance with the invention, the VBN fabric routes block storage requests from storage initiators to virtual storage targets. In one embodiment, requests from a virtual storage initiator to a virtual storage target on the same blade do not pass "over the wire". Rather, the VBN fabric routes such requests within the virtualized environment (i.e., over a virtual channel). In another embodiment in which the storage target is on another physical blade (i.e., in the same storage "box", but in a different, independent modular enclosure), the VBN fabric may route the request over a physical connection, i.e., an inter-machine communication link between the blades.

Having virtual storage targets within a virtualized computing environment enables several advantageous developments. For one, it permits the convergence of different storage platforms within a single blade. For example, the virtualized computing environment within a single blade can include a first virtual machine that implements a NAS storage stack and a second virtual machine that implements a SAN storage stack. Another advantage is software fault isolation: each storage stack (i.e., virtual machine) represents an independent software fault domain. A software failure is confined to the particular faulting virtual machine—other virtual machines operating on the same electronic device are unaffected and remain operational.

Another advantage is virtual machine mobility—virtual machines can be migrated from one blade to another blade. One application of virtual machine mobility is load balancing: virtual machines can be moved from overloaded blades to under-utilized blades. In addition, the distribution of workload across multiple storage stacks decreases the impact of software faults on the storage system as a whole.

Virtual machines running on a blade are also able to make more efficient use of the hardware resources than a single storage stack. Blades can have as many virtual machines as can be supported by the underlying hardware. In contrast, an electronic device running a single storage stack may have difficulty fully utilizing advancements in storage technology, e.g., increases in the number of processor cores, in the number of ports, and in port speed.

FIG. 1 shows an embodiment of a storage networking environment 2, including a blade server 10 in communication with a storage area network (SAN) fabric 12. Embodiments of the SAN fabric 12 can include a FC (Fibre Channel) fabric and an iSCSI (Internet Small Computer System Interface) fabric. The blade server 10 may be coupled to more than one SAN fabric (e.g., FC and iSCSI), as represented in FIG. 1 by a second SAN fabric 12' drawn in phantom. The SAN fabric 12 is coupled to one or more storage arrays (not shown).

The blade server 10 includes a server chassis that houses electronic circuit boards (referred to as server blades or blades 14). Each blade 14 includes hardware, such as one or more processors 20, memory 22, input/output (I/O) ports 24, one or more host bus adaptors (HBA) 26, and a network controller—not shown. In one embodiment, the underlying architecture of the hardware of the blade 14 is x86. Software executing on the blade 14 abstracts the hardware of the blade 14 into virtual machines (VM) 16, individually, 16-1, 16-2, 16-3, and 16-4. An example of software for implementing virtual machines on a blade is VMware ESX Server, produced by VMware® of Palo Alto, Calif.

In general, each VM 16 includes an application executing within its own operating system. Any type of application can execute on a VM 16. Examples of applications include but are not limited to Network Attached Storage (NAS), Storage Area Network (SAN), iSCSI initiator, application server, block data encryption, deduplication, decryption, mirroring, snapshot backups, and other block storage applications. The operating systems with which these applications operate may also vary. For example, SAN applications may execute in a Windows™ operating system environment, NAS applications in a Linux operating system, and CAS (Content Addressable Storage) applications in a proprietary operating system environment. Accordingly, on a single blade 14, different types of storage stacks (e.g., NAS, SAN, CAS) and different operating systems may converge, depending on the types of applications running on the VMs 16 at the blade 14.

VMs 16 running storage applications have a storage stack (i.e., layered software for providing the particular functionality of the storage application). VMs with storage stacks can export one or more virtual storage initiators (I), virtual storage targets (T), or a combination of virtual storage initiators and virtual storage targets (T and I). In general, a virtual storage initiator includes a virtual device that issues storage requests or commands (e.g., SCSI command descriptor blocks or CDBs) for reading data from or writing data to a target device. A virtual storage target includes a virtual device that responds to the requests of a storage initiator. As examples, the VM 16-1 has a virtual storage initiator, each of the VM 16-2, 16-3 has a virtual storage target and a virtual storage initiator.

Virtual storage initiators and targets may be referred to herein by the storage protocol with which they communicate, e.g., virtual FC targets, virtual iSCSI initiators. In general, virtual FC initiators and FC targets are visible to initiators and targets in a FC fabric, and virtual iSCSI initiators and virtual iSCSI targets are visible to initiators and targets in an iSCSI fabric. Virtual VBN initiators and virtual VBN targets communicate in accordance with the VBN protocol, and can communicate with initiators and targets in either the FC fabric, iSCSI fabric, or both, provided such VBN virtual devices login with both SAN fabrics. To the FC fabric, a VBN virtual device appears as a FC device, to the iSCSI fabric, as an iSCSI device.

Each VM 16 couples to a virtual block network (VBN) fabric 18. In general, the VBN fabric 18 is a lightweight block storage infrastructure for the virtualized computing environment. The VBN 18 provides a transport protocol (layered on top of SCSI) that enables the storage stacks of the VMs 16 to participate actively in the attached physical SAN fabric 12 (or fabrics 12, 12'). Although shown to be external to the SAN fabric 12, the blade 14 may be considered to be included in the SAN fabric 12 because the virtual storage initiators and virtual storage targets presented by the VMs running on the blade 14 are exposed to storage initiators and storage targets in the SAN fabric 12.

Figure 2:
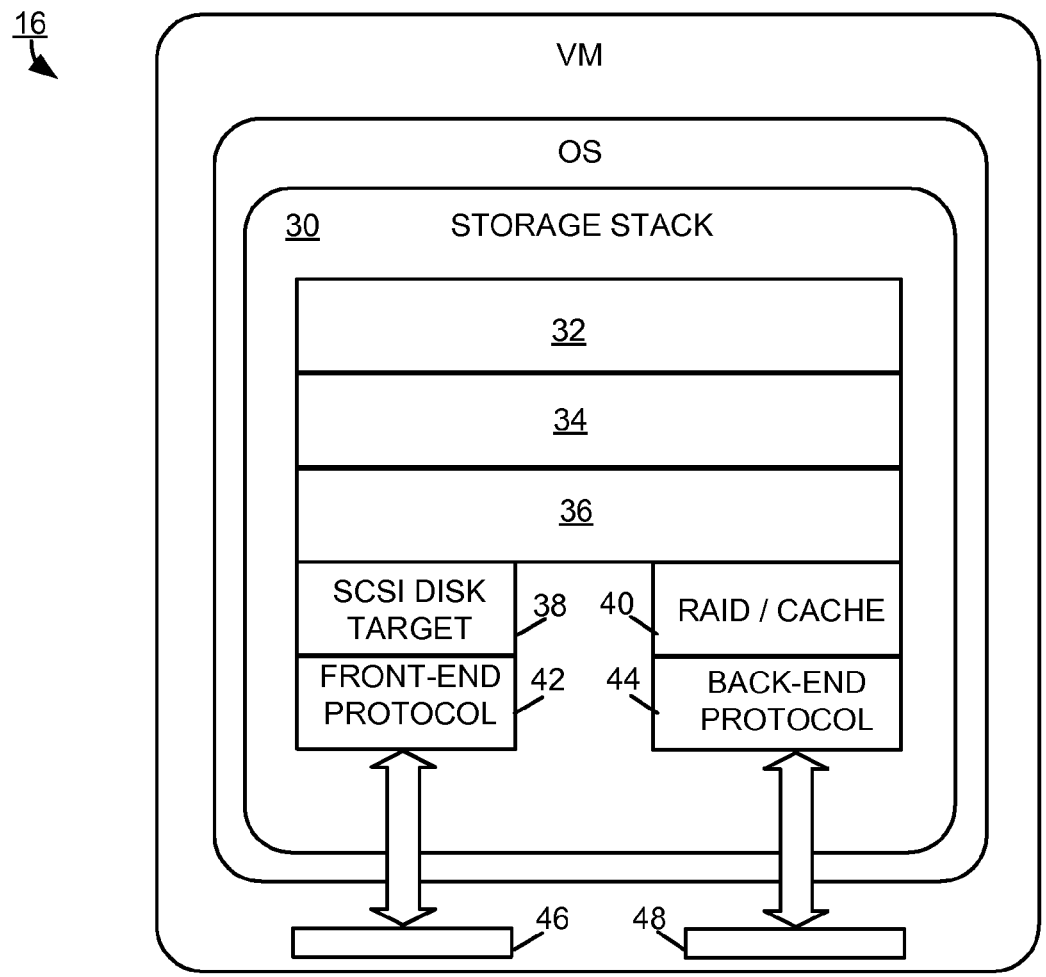
FIG. 2 is a block diagram representation of an embodiment of a virtual machine of FIG. 1, including a storage stack.

FIG. 2 shows an exemplary embodiment of a VM 16 having a storage stack 30, here, as an example, for a SAN application (e.g., Clariion). In general, the storage stack 30 includes layered drivers (i.e., software components for extended functionality) that embody the real value of the SAN application. In this example, the storage stack 30 includes layered application software 32, 34, 36 (e.g., EMC Corporation's Fusion™, MirrorView™, and SnapView™ applications) and program code for implementing a SCSI disk target 38, a RAID engine and block cache 40, a front-end protocol 42, and a back-end protocol 44. Each layer above the protocol layer 42, 44 maintains its own data. The front-end protocol 42 is in communication with a first virtual controller 46, and the back-end protocol 44 is in communication with a second virtual controller 48. The VM 16 has a worldwide unique target endpoint address, assigned and used by the VBN fabric 18 to route communications.

Figure 3:
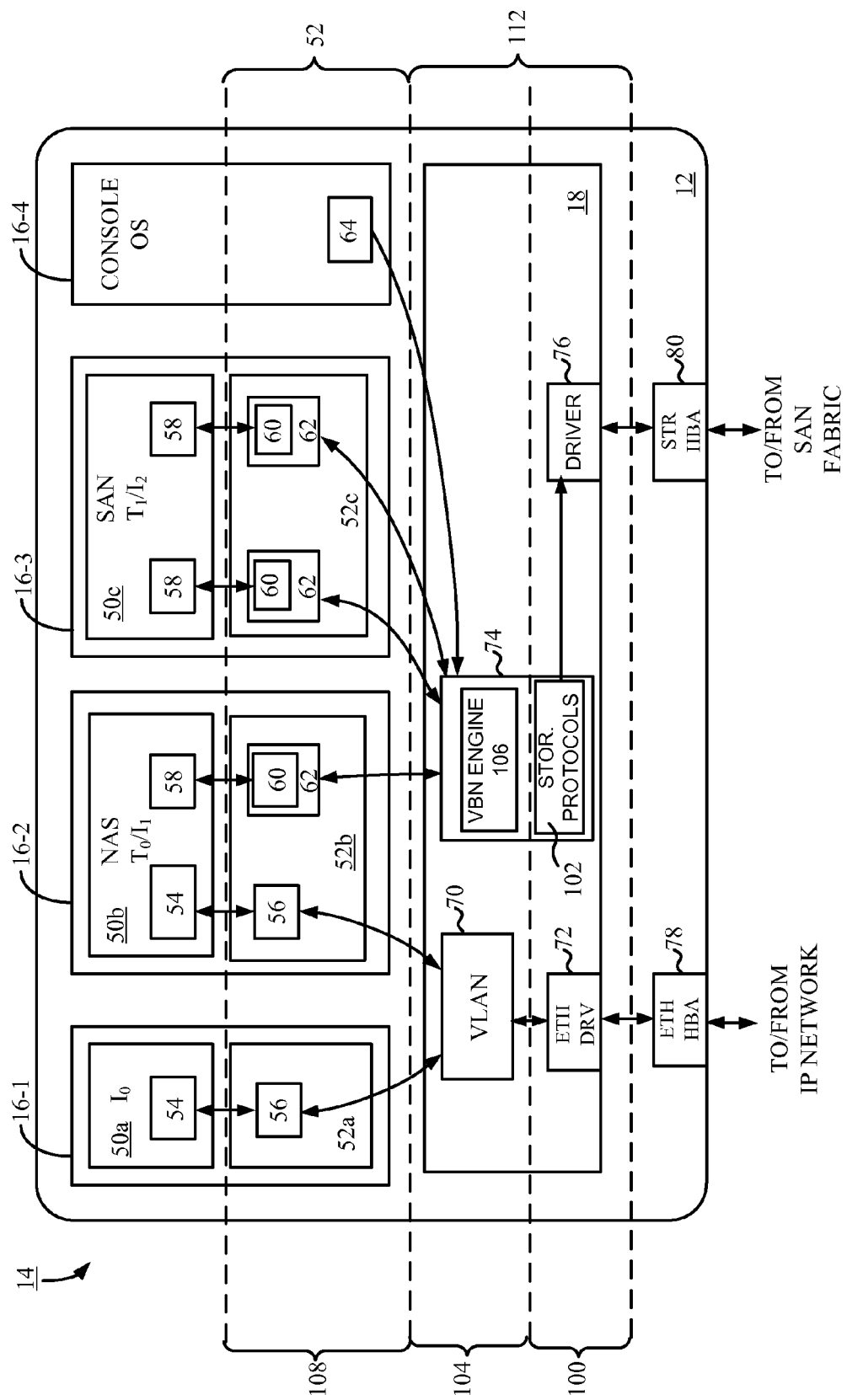
FIG. 3 is a block diagram representation of an embodiment of the blade in FIG. 1 in more detail.

FIG. 3 shows an exemplary embodiment of the blade 14 of FIG. 1 and the plurality of virtual machines 16-1, 16-2, 16-3, and 16-4 coupled to the VBN fabric 18. Each of the VMs 16-1, 16-2, 16-3 includes an application 50, executing in a guest operating system, and a virtual machine monitor (VMM) 52. In general, the VMM 52 is software residing between the guest operating system and the processor and memory of the blade 14.

The VM 16-1 includes an application 50a and a virtual machine monitor (VMM) 52a. In this example, the application 50a produces a virtual Ethernet device driver 54 and functions as an initiator ($I_0$) that can communicate using TCP/IP. The VMM 52a includes a virtual Ethernet device 56 that is in communication with the virtual Ethernet device driver 54 and provides a standard interface for Ethernet messages.

The VM 16-2 includes a NAS storage application 50b that presents a virtual target ($T_0$) and a virtual storage initiator ($I_1$). The virtual target ($T_0$) includes a virtual Ethernet device driver 54. The virtual Ethernet device 56 of the VMM 52b provides a standard interface for the Ethernet device driver 54. Through the virtual Ethernet device driver 54 and virtual Ethernet device 56, the virtual target ($T_0$) receives Ethernet messages, e.g., from the virtual initiator ($I_0$) of the VM 16-1.

To operate as a Fibre Channel (FC) storage initiator, the NAS storage application 50b has a virtual Fibre Channel (FC) device driver 58 for initiating FC requests, processing FC asynchronous notifications, and enforcing FC object addressing. The VMM 52b also includes a virtual FC device 60 for providing a standard interface for the FC block requests, bulk data, and asynchronous notifications. A VBN translator 62 is in communication with the FC device 60 for translating VBN-based messages coming from the VBN fabric 18 into FC messages, and FC messages going out to the VBN fabric 18 into VBN-based messages.

The VM 16-3 includes a SAN storage application 50c that presents a storage target ($T_1$) and a storage initiator ($I_2$). The storage target ($T_1$) and storage initiator ($I_2$) each communicate through a virtual FC device driver 58. The VMM 52c has virtual FC devices 60 providing standard FC interfaces to these FC device drivers 58. The VBN translators 62 of the VMM 52c translate VBN-based messages coming from the VBN fabric 18 into FC messages, and FC messages going out to the VBN fabric 18 into VBN-based messages.

In alternative embodiments, either, or both of the virtual machines 16-2, 16-3 use VBN device drivers and VBN devices, instead of FC device drivers and FC devices. The VBN drivers and devices communicate with the VBN fabric 18 in accordance with a VBN protocol. A VBN device driver initiates VBN-based requests, handles VBN-based asynchronous notifications, and enforces VBN-based object addressing. The virtual VBN devices (i.e., virtual block device controllers) of the VMM provide an interface to the VBN device drivers for handling block requests, bulk data transfers, and asynchronous notifications. A translator is unnecessary to translate VBN-based messages coming from or going to the VBN fabric 18.

The VM 16-4 includes a console operating station 50d having a VBN management component 64 for communicating with a management component of the VBN fabric 18.

The VBN fabric 18 includes a virtualized LAN 70 in communication with a virtual Ethernet driver 72. The virtual initiator ($I_0$) and virtual target ($T_0$) of the VMs 16-1 and 16-2, respectively, are able to send and receive communications over the virtual LAN 70. The virtual Ethernet driver 72 is in communication with an Ethernet host bus adapter 78 (hardware) for sending and receiving TCP/IP communications over an external IP network (e.g., the Internet).

The VBN fabric 18 also includes VBN driver components 74 in communication with a storage protocol driver (e.g., FC, iSCSI) 76. The storage protocol driver 76 is in communication with an appropriate host bus adapter 80 (hardware) for sending and receiving communications over to and from the SAN fabric 12 in accordance with the particular storage protocol (e.g., FC, iSCSI). The virtual storage initiators $I_1$, $I_2$, and the virtual storage target $T_1$ are coupled to the VBN fabric 18. The VBN driver components 74 provide the functionality of the VBN fabric 18 used to achieve virtualization of the SAN on the blade 14.

The VBN fabric 18 can be represented as having three layers: a physical interface layer 100, a core layer 104, and a storage endpoint layer 108. The physical interface layer 100 and core layer 104 are contained within a hypervisor 112: a thin layer of software that runs on the hardware and generally provides the virtual partitioning among the VMs 16 coupled to the VBN fabric 18. The storage endpoint layer 108 is contained within the VMMs 52 of the VMs 16.

At the physical interface layer 100 are physical endpoint ports. In addition, virtual endpoint ports (using an existing port technology, e.g., n-port virtualization (NPIV) for FC) can also be defined in this layer. There are also one or more standard protocol adapters (e.g., FC, iSCSI) 102 and associated drivers 76. In one embodiment, the physical interface layer 100 also includes an inter-machine transport adapter for inter-machine communications (i.e., between blades in the same box using, e.g., InfiniBand).

At the VBN core layer 104 is a VBN engine 106 for intercepting and rerouting requests. The VBN core layer 104 includes a name service and snoops logins from the VMs 16 to the SAN fabric to build a local name database. There can be one or more virtual storage endpoint ports per port exported by the physical interface layer. Each storage endpoint virtual port is assigned to, at most, one virtual machine.

For resident transactions (i.e., between VMs co-residing on the same blade) and inter-machine transport transactions, the core layer 104 can avoid transmitting requests "over the wire" (i.e., to the SAN fabric 12). Transmitted data are copied directly from the physical memory pages of the source VM to the physical memory pages of the destination VM using direct memory access (DMA) facilities, as described further below.

At the storage endpoint layer 108 are the storage endpoints that operate according to a standard block storage protocol (e.g., FC, iSCSI) or according to a custom VBN protocol for virtual ports. Virtual targets and initiators fully participate independently with the external SAN fabric 12, as though coupled directly to external SAN (although, in actuality, coupled to the virtual fabric 18).

Storage interconnect options include using standard interconnects, such as FC and iSCSI, and custom interconnects. Virtual devices that use a standard block storage protocol promote compatibility with third-party applications. Virtual devices that use a custom VBN protocol can be optimized for communicating with the VBN fabric 18. Target-capable virtual devices expose an interface to guest initiator and target drivers.

Figure 4:
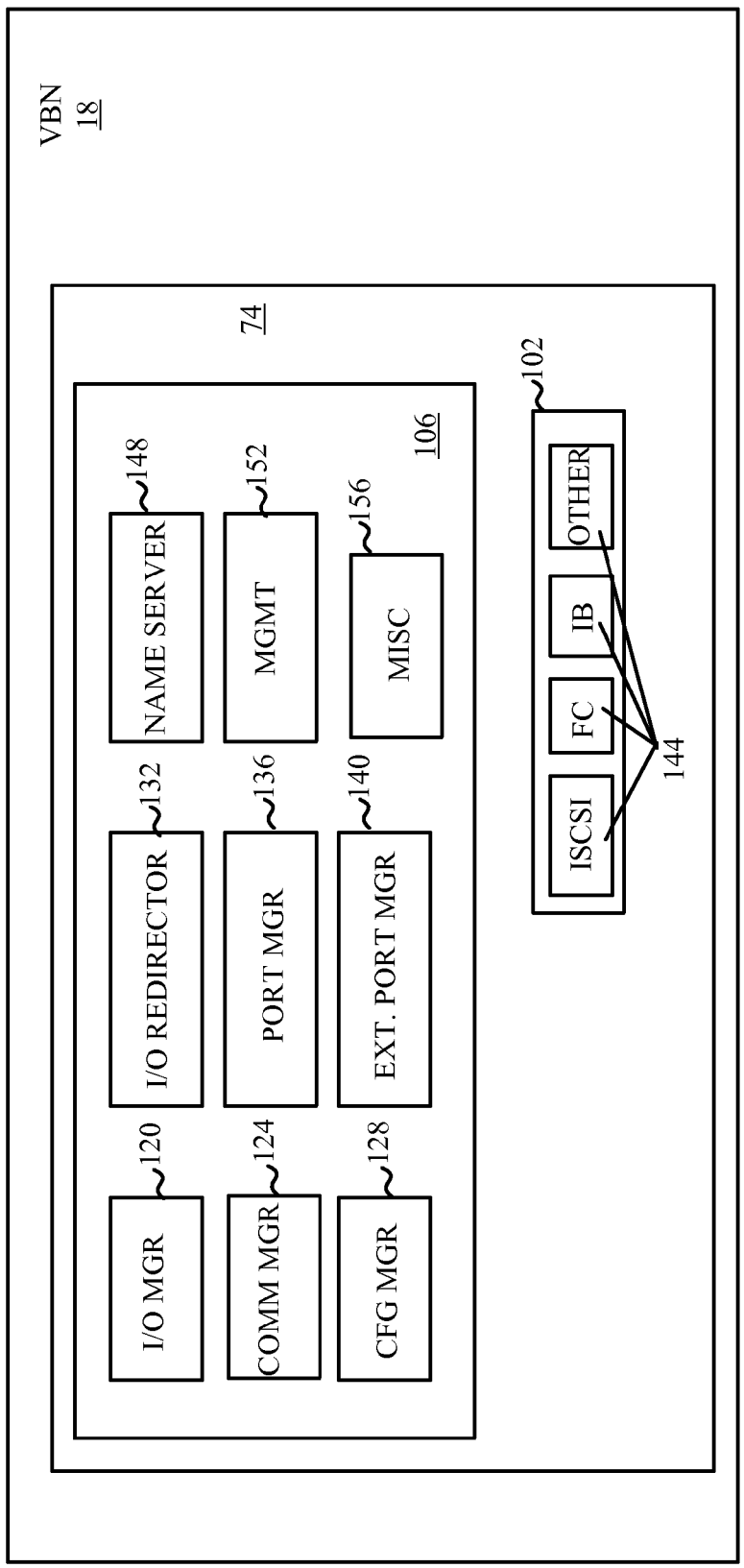
FIG. 4 is a block diagram representation of the virtual block fabric of FIG. 1 having various device driver components.

FIG. 4 shows a block diagram of an embodiment of the VBN driver components 74 (within the hypervisor 112). The VBN driver components 74 include an I/O manager 120, a communications manager 124, a configuration (CFG) manager 128, an I/O redirector 132, a port manager 136, an external port manager 140, external protocols 144, a name server 148, and a management component 152.

The I/O manager 120 controls aspects of I/O data transfers within the virtual VBN fabric 18 (e.g., buffer management, scatter/gather list management, data copy services). The communications manager 124 controls aspects of message communications between VBN driver components 74 (local and remote on other VBN-equipped blades). The configuration manager 128 controls aspects of VBN component and virtual fabric configuration. The I/O redirector 132 controls aspects of virtual VBN fabric request routing. The port manager 136 presents a pool of VBN ports and handles translations between the VBN ports and a pool of physical and virtual external ports.

The external port manager 140 manages a pool of the available protocol-specific physical or virtual ports. The external protocols 144 handle incoming and outgoing standard block device protocols, examples of which are FC, iSCSI, and InfiniBand (IB). The VBN name server 148 manages a simple VBN name service table for request routing purposes in the virtual VBN fabric 18. The management component 152 communicates with the COS management component 64 (FIG. 3) for handling VBN management operations exposed to an administrator. There are other hypervisor driver components 156 for handling miscellaneous services not provided by any other VBN components (e.g., memory pools).

Figure 5A:
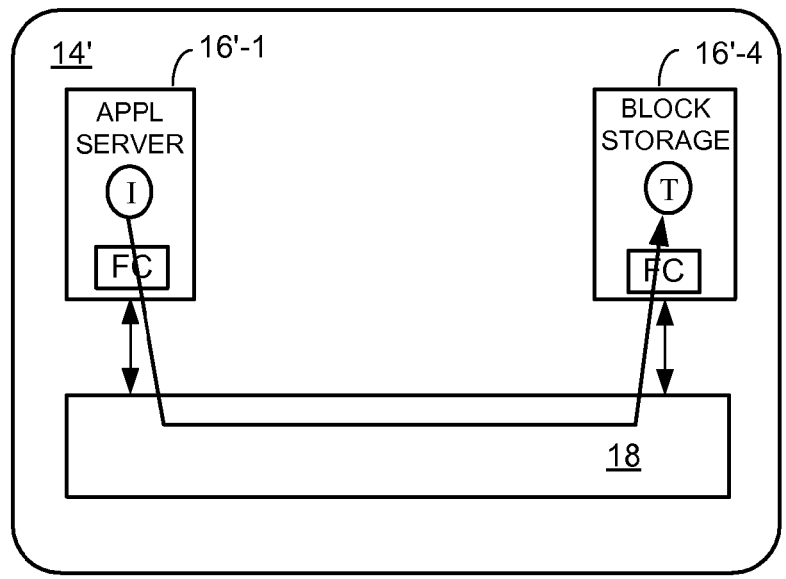
FIG. 5A is a block diagram representation of an embodiment of a virtual storage area network embedded on the blade.

FIG. 5A shows an example of a virtual storage area network that can be embedded on a blade 14' in accordance with the invention. The embedded storage area network includes an application server VM 16'-1 and a block storage VM 16'-4. In this embodiment, the application server VM 16'-1 exports a virtual FC initiator and the block storage exports a virtual FC target. Because the VMs are co-resident, requests from the virtual FC initiator pass to the virtual FC target by way of the VBN fabric 18. The virtualization of the storage target has effectually brought the SAN fabric into the virtualized environment on the blade 14': the block storage operation occurs entirely within the confines of the blade 14'.

To maintain isolation between VMs, the VMs do not share physical memory. Associated with each VM is its own separate memory. For a transfer of block data from a source VM (e.g., VM 16'-1) to a destination VM (e.g., VM 16'-4), the VMM 52 of the source VM sends the physical (machine) address at which the block data are stored to the hypervisor 112. The hypervisor 112 accesses this address location and performs a single data copy to the physical memory associated with the destination VM. In effect, the block data have traversed from the source VM to the destination VM over a virtual channel provided by the VBN fabric 18.

Figure 5B:
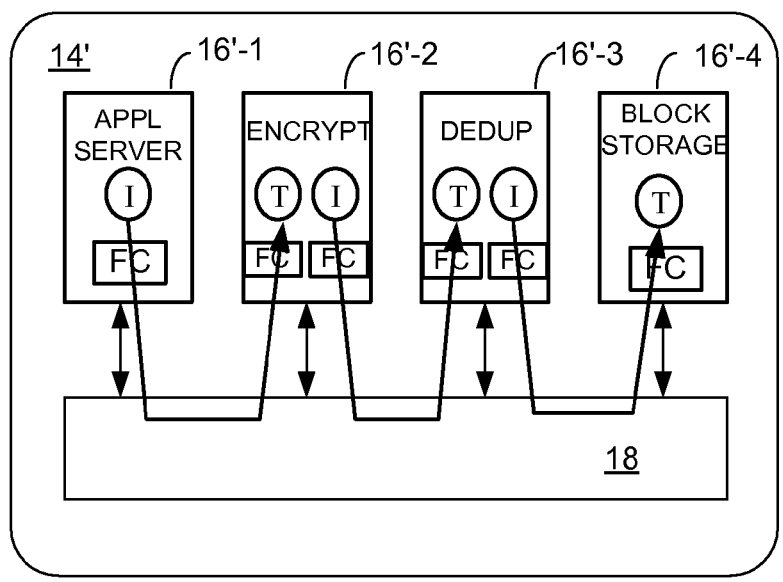
FIG. 5B is a block diagram representation of another embodiment of the virtual storage area network of FIG. 5A with additional storage application virtual machines for extending the storage functionality of the blade.

FIG. 5B shows the embedded storage area network of FIG. 5A with additional VMs 16'-2, 16'-3 running applications that extend the storage functionality of the blade 14'. In this example, the extended storage functionality includes an encryption application VM 16'-2 and a deduplication application VM 16'-3 that reside in the data path between the application server VM 16'-1 and the block storage VM 16'-4. Each of the additional VMs includes a virtual FC initiator and a virtual FC target. The virtual FC initiator of the application server VM 16'-1 sends the request to the block storage VM 16'-4. The VBN fabric 18 intercepts and routes the request to the virtual FC target of the encryption application VM 16'-2, which encrypts the data. The virtual FC initiator of the encryption VM 16'-2 forwards the results to the VBN fabric 18, which routes the request to the virtual FC target of the deduplication application VM 16'-3. After the deduplication application VM 16'-3 completes its operations, its virtual FC initiator forwards the results to the VBN fabric 18 and the VBN fabric 18 sends the results to the virtual FC target of the block storage VM 16'-4. The encryption and deduplication VMs 16'-2, 16'-3 are examples of applications that can be used. The principles of the invention apply to other types of storage applications, e.g., thin provisioning, replication, decryption, snapshot backups.

Figure 6:
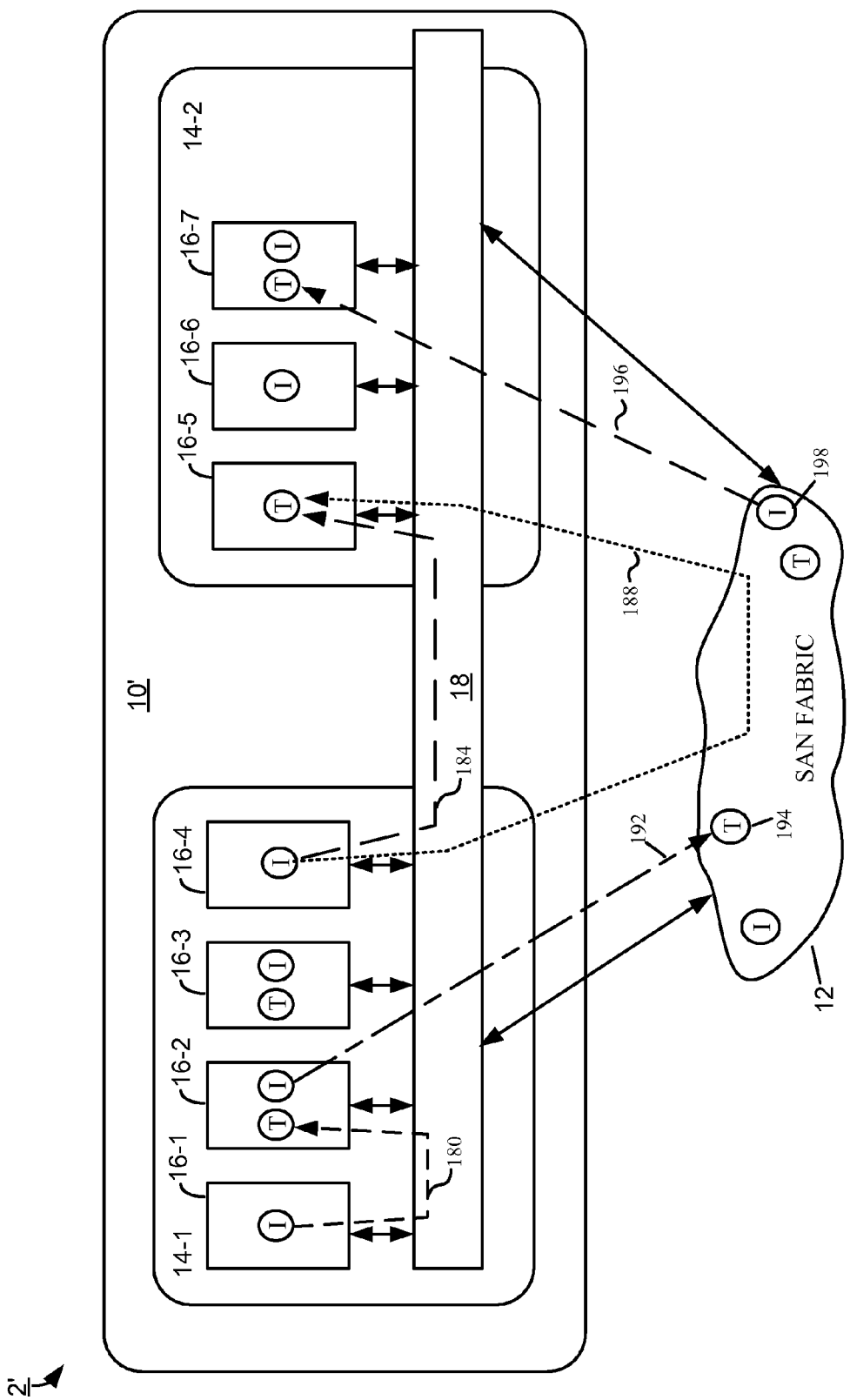
FIG. 6 is a block diagram representation illustrating various exemplary routes that may be taken by request from storage initiators to storage targets.

FIG. 6 shows an embodiment of a storage network environment 2' including a blade server 10' having a plurality of blades 14-1, 14-2. Running on the blade 14-1 are VMs 16-1, 16-2, 16-3, and 16-4. Blade 14-2 is running VMs 16-5, 16-6, and 16-7. Illustrated in FIG. 6 are various exemplary routes that may be taken by requests from storage initiators to storage targets. Although, generally, FC initiators send requests to FC targets, iSCSI initiators send requests to iSCSI targets, and VBN initiators send requests to VBN targets, the VBN protocol employed by the VBN fabric 18 enables communication between initiators and targets of mixed storage protocols (e.g., iSCSI initiators and FC targets, VBN initiators and iSCSI targets, FC initiators and VBN targets). For communications between virtual devices of mixed storage protocols, the virtual devices are exposed to each type of associated SAN fabric (e.g., FC, iSCSI). For example, to receive requests from an iSCSI initiator, an FC target is made visible to the iSCSI fabric (in addition to the FC fabric). For iSCSI and FC initiators and targets to be able to communicate with a VBN virtual device, the VBN virtual device is exposed to both the FC fabric and iSCSI fabric.

In FIG. 6, a first route 180 is between co-resident VMs 16-1 and 16-2. The VBN fabric 18 forwards the request from the virtual storage initiator of the VM 16-1 to the virtual storage target of the VM 16-2 without the request leaving the blade 14-1.

A second exemplary route 184 is between a virtual storage initiator at the first blade 14-1 and a virtual storage target at the second blade 14-2. In this example, there exists a high-speed inter-machine communication link between the two blades. The VBN fabric 18 is able to route the request without having to send the request to the SAN fabric 12 (i.e., without leaving the blade server 10'). If there is no inter-machine link, the request takes a third exemplary route 188 that leaves the blade server 10' and passes through the SAN fabric 12.

Virtual storage initiators can also send requests to physical targets on the SAN fabric 12, as illustrated by a fifth route 192 between the virtual storage initiator at the VM 16-2 and the target 194 in the SAN fabric 12. Conversely, virtual storage targets can be sent messages from a physical initiator, as represented by a sixth route 196 between the initiator 198 in the SAN fabric 12 and the virtual storage target at the VM 16-7.

Figure 7:
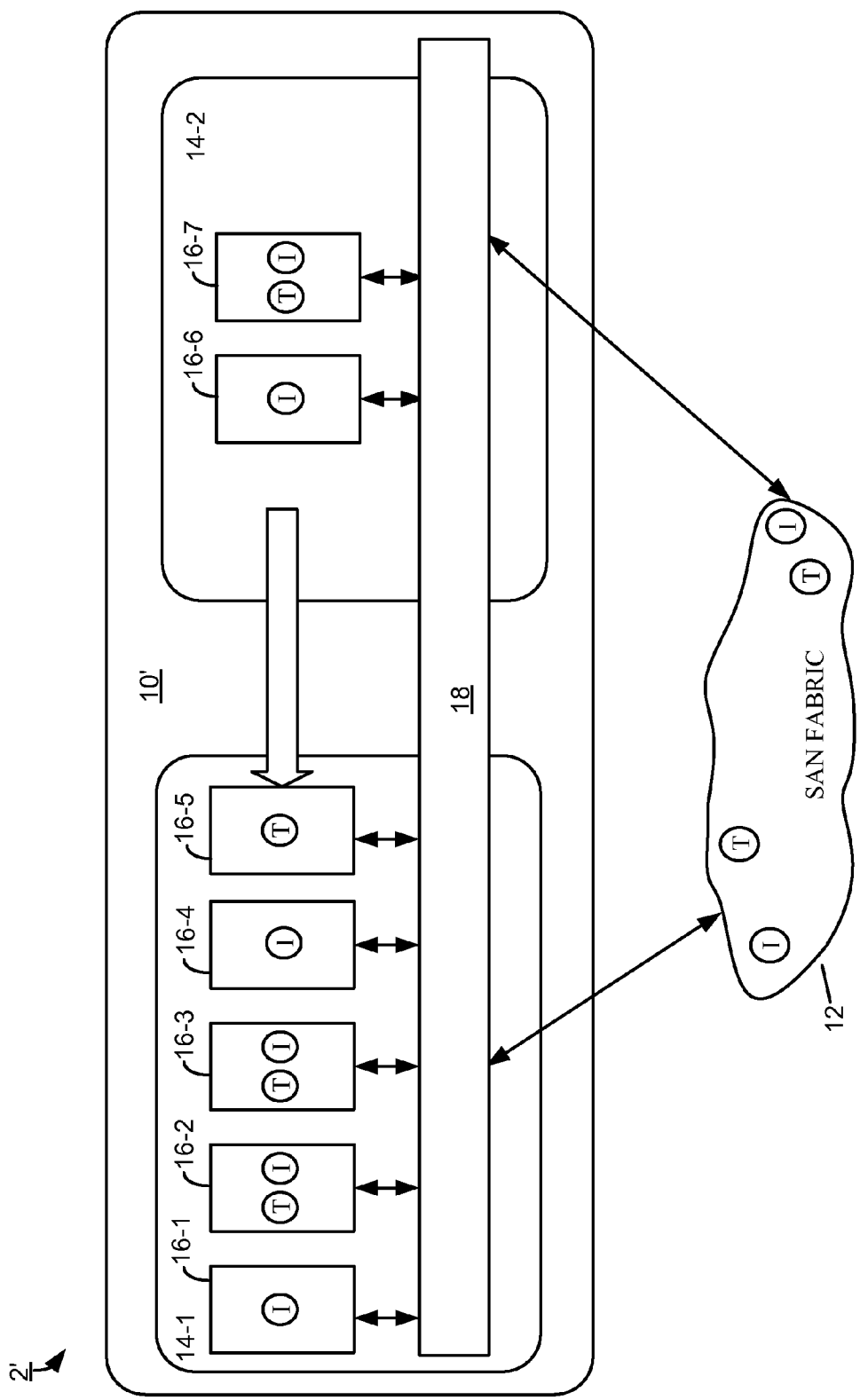
FIG. 7 is a block diagram representation illustrating an example of virtual machine mobility.

FIG. 7 shows the storage network environment 2' of FIG. 6, and illustrates virtual machine mobility. In general, an administrator can move a VM from one blade to another blade, provided the blades have the same hardware configuration and have access to the same SAN fabric. As shown, the VM 16-5 in the second blade 14-2 is moved to the first blade 14-1. The virtual address associated with the VM 16-5 moves with the VM 16-5, as does the data currently active at the various software layers in the storage stack.

Figure 8:
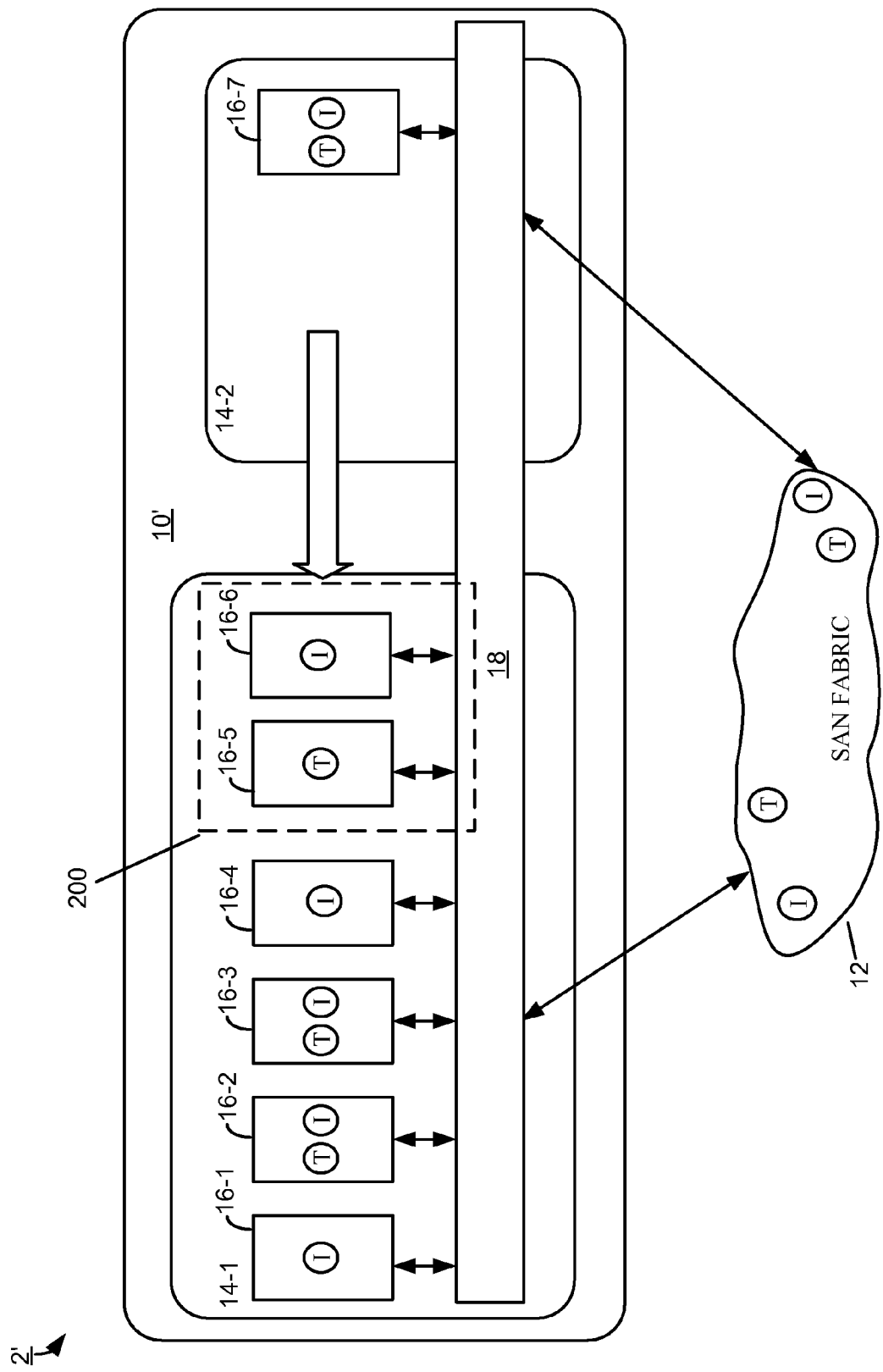
FIG. 8 is a block diagram representation illustrating an example of grouped virtual machine mobility.

In addition, in one embodiment, an administrator can group VMs. Grouped VMs move together, that is, one VM in the group cannot be moved separately from the group. FIG. 8 illustrates VM grouping and group mobility. VMs 16-5, 16-6 of the blade 14-2 are in a defined group 200 and are migrated together to the blade 14-1. This grouping feature may be useful to ensure secure containment of the entire application data path.

Figure 9A:
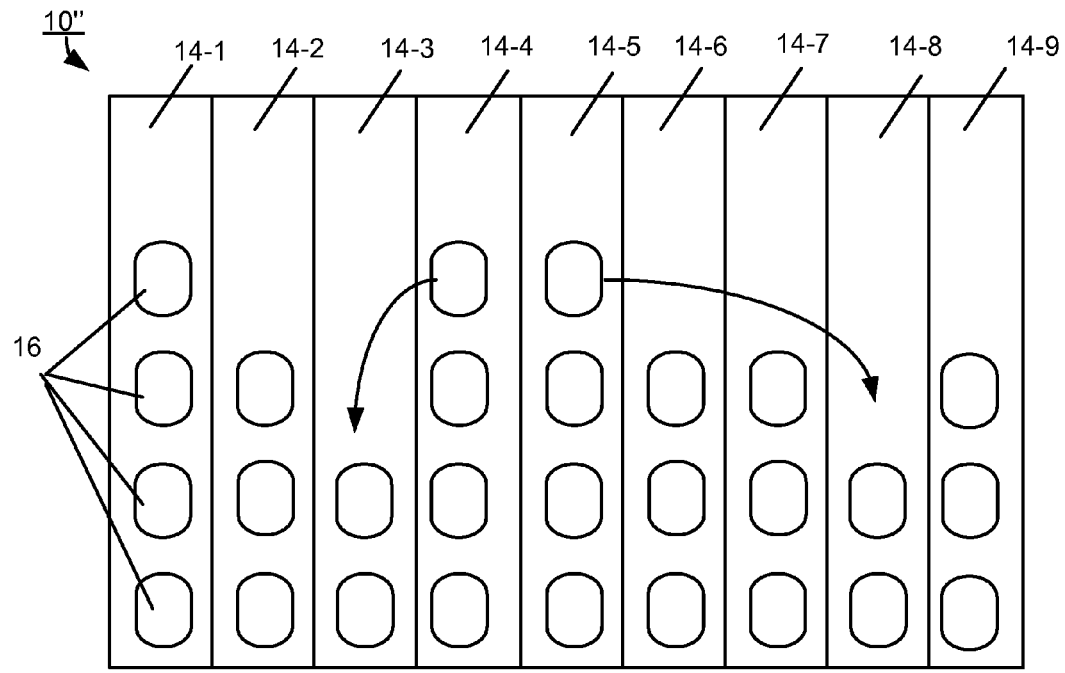
FIG. 9A and FIG. 9B are block diagram representations illustrating load balancing (through virtual machine mobility) in a server farm comprised of multiple blades.
Figure 9B:
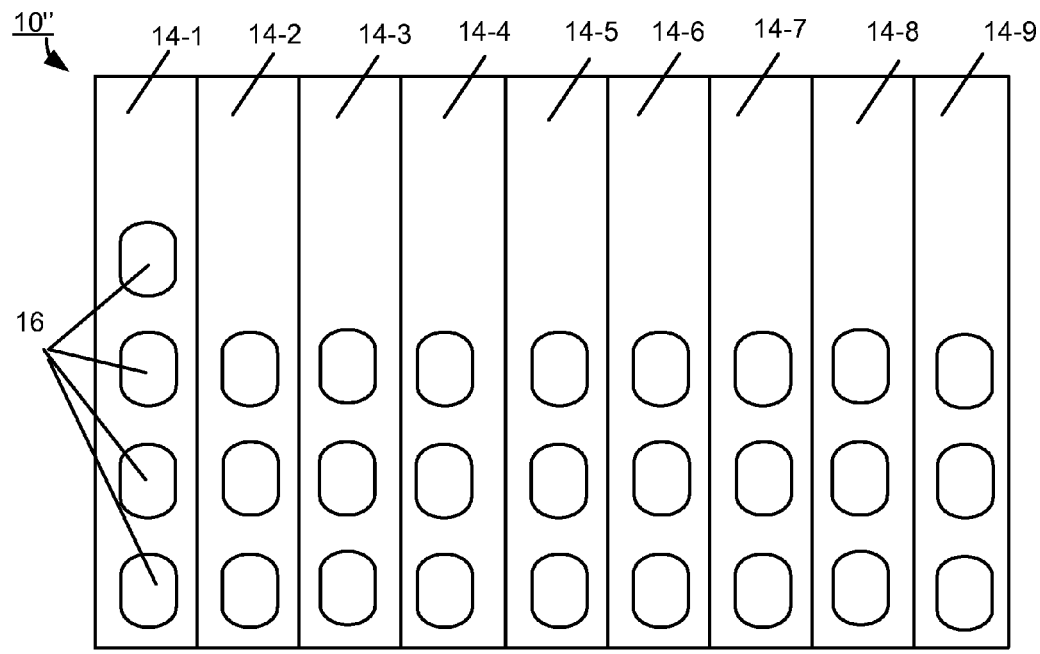

FIG. 9A and FIG. 9B shows the use of virtual machine mobility for load balancing. As shown, a server farm 10" has nine blades, labeled 14-1 to 14-9. FIG. 9A shows a first arrangement of virtual machines 16 on the blades. As an example, the blades 14-4, 14-5 each have four virtual machines. In this arrangement, these blades 14-4, 14-5 may be heavily loaded, whereas blades 14-3 and 14-8 may be underutilized. Because an administrator is able to move virtual machines, the administrator can move virtual machines from the more heavily loaded blades to the lightly loaded blades. FIG. 9B shows an example of the server farm 10" after load balancing. In FIG. 9B, each blade 14-3 and 14-8 has received an additional virtual machine (one taken from each of the blades 14-4 and 14-5, respectively).

FIG. 10A and FIG. 10B illustrate an advantage gained from the ability to converge different storage platforms on a single blade. In FIG. 10A, a storage network environment 2" includes a Physical disk enclosure 220, a Power Management blade 224, two NAS blades 228, a NAS Management blade 232, and two SAN blades 236. Each NAS blade 228 runs a NAS VM 216 (for redundancy). In one exemplary implementation, the NAS blades 228 are separate x86 processor complexes that provide file storage, having front-end ports for networking with clients and back-end ports connected to SAN blades 236. Each SAN blade 236 runs a SAN VM 216' (for redundancy). The back-end ports of the SAN blades 236 are coupled to the physical disk storage provided by the Physical disk enclosure. The NAS Management blade 232 has a NAS Management VM 216".

Consolidation of the number of blades can be achieved by combining different VMs on a single blade, as shown in FIG. 10B. A first blade 214-1 includes one of the NAS VMs 216 and one of the SAN VMs 216'. A second blade 214-2 includes the other NAS VM 216, the other SAN VM 216' (to maintain redundancy), and the NAS Management VM 216". As a result, the number of blades in the storage network environment has become consolidated from five to two.

Figure 10C:
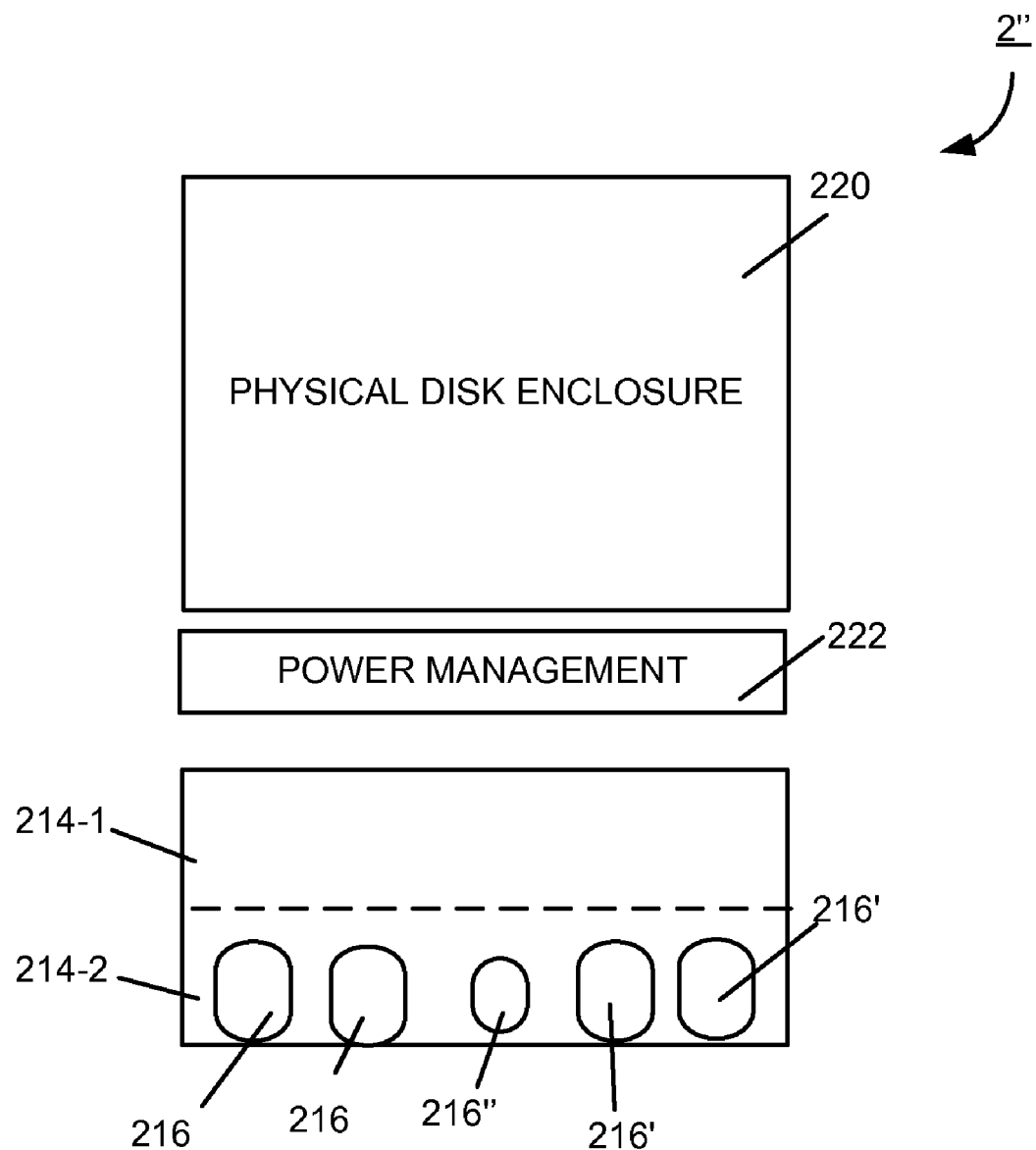
FIG. 10C is a block diagram representation illustrating maintenance and repair through virtual machine mobility.

FIG. 10C shows the use of virtual machine mobility in the consolidated storage network environment 2" of FIG. 10B for implementing repairs or upgrades. Consider, for example, that the first blade 214-1 is to be taken offline for upgrading. Through a combined SAN/NAS management utility, an administrator can migrate (while online) the NAS VM 216 and the SAN VM 216' on the first blade 214-1 to the second blade 214-2. As a result, the second blade 214-2 has the five VMs, which can continue to operate, whereas the first blade has none and can then be taken offline without affecting system operation.

Aspects of the present invention may be implemented, in whole or in part, as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims. For example, although various embodiments are described with reference to iSCSI and FC protocols, it is to be understood that the principles of the invention apply to any transport of SCSI protocol, of which iSCSI and FC are examples.

What is claimed is:

1. A storage area network embedded in an electronic device housing one or more processors, the one or more processors executing program code comprising:

program code for producing a first virtual machine on the electronic device, the first virtual machine providing a virtual storage initiator that issues storage requests to read or to write data; and program code for producing a second virtual machine on the electronic device, the second virtual machine providing a virtual storage target that responds to storage requests, wherein the virtual storage target is exposed to an external storage area network (SAN) fabric in order to enable storage initiators in the external SAN fabric to issue storage requests to the virtual storage target, and wherein the second virtual machine has its own storage stack comprised of layered software configured to perform, in accordance with a storage protocol, storage communications in response to the storage requests issued by the storage initiators in the SAN fabric and in response to the storage requests issued by the virtual storage initiator.

2. The storage area network of claim 1, further comprising program code for sending the storage requests issued by the virtual storage initiator from the virtual storage initiator to the virtual storage target over a virtual connection on the electronic device.

3. The storage area network of claim 1, further comprising a virtual fabric coupling the first and second virtual machines to the external storage area network (SAN) fabric such that the storage initiators in the external storage area network (SAN) fabric can communicate with the virtual storage target of the second virtual machine.

4. The storage area network of claim 1, wherein each of the virtual storage initiator and the virtual storage target includes a virtual Fibre Channel storage device.

5. The storage area network of claim 1, wherein each of the virtual storage initiator and the virtual storage target includes a virtual iSCSI (Internal Small Computer System Interface) storage device.

6. The storage area network of claim 1, wherein the first virtual machine that provides the virtual storage initiator includes a Network Area Storage (NAS) storage stack and the storage stack of the second virtual machine that provides the virtual storage target includes a Storage Area Network (SAN) storage stack.

7. The storage area network of claim 1, wherein the virtual storage target is a storage device to which the storage initiators in the external SAN fabric can address the storage requests issued by those storage initiators.

8. The storage area network of claim 1, wherein each virtual machine includes a translator configured to translate storage communications between the storage protocol of the second virtual machine's storage stack and a transport protocol shared by the virtual machines.

9. The storage area network of claim 1, wherein the storage protocol is a block storage protocol.

10. The storage area network of claim 1, wherein each of the first and second virtual machines logs in to the external SAN fabric, the first virtual machine thereby exposing the virtual storage initiator to the SAN fabric and the second virtual machine thereby exposing the virtual storage target to the external SAN fabric.

11. A system comprising:
an electronic device having at least one processor executing program code to produce a first virtual machine and a second virtual machine, the first virtual machine providing a virtual storage initiator that issues storage requests, the second virtual machine running a storage application that provides a virtual storage target, the virtual storage target being exposed to an external storage area network (SAN) fabric in order to enable storage initiators in the SAN fabric to issue storage requests to the virtual storage target, the second virtual machine having its own storage stack comprised of layered software configured to respond to the storage requests from the storage initiators in the SAN fabric and the virtual storage initiator in accordance with a storage protocol; and
a virtual fabric coupled between the second virtual machine and the external storage area network (SAN) fabric, the virtual fabric routing the storage requests from the storage initiators in the SAN fabric to the virtual storage target.

12. The system of claim 11, further comprising a second electronic device having at least one processor executing program code to produce a third virtual machine coupled to the virtual fabric, the third virtual machine running an application that issues storage requests to the virtual storage target.

13. The system of claim 12, wherein the electronic device is a first electronic device, and further comprising an inter-machine communication link between the first and second electronic devices, wherein the virtual fabric sends the storage requests issued by the application running on the third virtual machine from the second electronic device directly to the first electronic device with the virtual storage target over the inter-communication link.

14. The system of claim 12, wherein the virtual fabric routes the storage requests issued by the application running on the third virtual machine externally through the SAN fabric.

15. The system of claim 12, further comprising a plurality of virtual machines on one of the electronic devices, program code for grouping the plurality of virtual machines, and program code for moving grouped virtual machines together from that one electronic device to the other electronic device.

16. The system of claim 11, where the SAN fabric is a Fibre Channel fabric.

17. The system of claim 11, where the SAN fabric is an iSCSI (Internet Small Computer System Interface) fabric.

18. The system of claim 11, wherein the virtual storage target is a Fibre Channel target.

19. The system of claim 11, wherein the virtual storage target is an iSCSI target.

20. The system of claim 11, wherein the at least one processor of the electronic device executes program code to produce a third virtual machine coupled to the virtual fabric, the second virtual machine providing a Network Area Storage (NAS) application and the third virtual machine providing a Storage Area Network (SAN) application.

21. The system of claim 11, wherein the virtual storage target is a storage device to which the storage initiators in the external SAN fabric can directly address a storage request.

22. The system of claim 11, wherein the second virtual machine includes a translator configured to translate storage communications between the storage protocol of the storage stack and a transport protocol provided by the virtual fabric.

23. The system of claim 11, wherein the storage protocol is a block storage protocol.

24. The system of claim 11, wherein the second virtual machine logs in to the SAN fabric to expose the virtual storage target to the SAN fabric.

25. A computer-implemented method of embedding a virtual storage area network on an electronic device, the method comprising:
running a first virtual machine on the electronic device, the first virtual machine providing a virtual storage initiator that issues storage requests;
running a second virtual machine on the electronic device, the second virtual machine running a storage application that provides a virtual storage target for responding to storage requests;
coupling a virtual fabric between the second virtual machine and an external storage area network (SAN) fabric;
exposing the virtual storage target on the second virtual machine to the external SAN fabric in order to enable storage initiators in the external SAN fabric to issue storage requests to the virtual storage target; and
routing, by the virtual fabric, a storage request from one of the storage initiators in the external SAN fabric to the virtual storage target, wherein the second virtual machine has its own storage stack comprised of layered software for responding to storage requests from the storage initiators in the SAN fabric and the virtual storage initiator in accordance with a storage protocol.

26. The method of claim 25, wherein one of the virtual machines provides a Network Area Storage (NAS) application and the other of the virtual machines provides a Storage Area Network (SAN) application.

27. The method of claim 25, further comprising the step of running a third virtual machine on a second electronic device, the third virtual machine providing a second virtual storage initiator that issues storage requests to the virtual storage target.

28. The method of claim 27, further comprising the steps of coupling the first and second electronic devices with an inter-machine communication link and routing, by the virtual fabric, the storage requests issued by the second virtual storage initiator to the virtual storage target over the inter machine communication link.

29. The method of claim 27, further comprising the step of routing, by the virtual fabric, the storage requests issued by the second virtual storage initiator to the virtual storage target through the SAN fabric.

30. The method of claim 27, further comprising the steps of running a plurality of virtual machines on one of the electronic devices, grouping the plurality of virtual machines, and moving grouped virtual machines together from that one electronic device to the other electronic device.

31. The method of claim 27, further comprising the step of moving the second virtual machine from the first electronic device to the second electronic device.

32. The method of claim 25, where the SAN fabric is a Fibre Channel fabric.

33. The method of claim 25, where the SAN fabric is an iSCSI (Internet Small Computer System Interface) fabric.

34. The method of claim 25, wherein the virtual storage target is a Fibre Channel target.

35. The method of claim 25, wherein the virtual storage target is an iSCSI target.

36. The method of claim 25, wherein the virtual storage target is a storage device to which the storage initiators in the external SAN fabric can address a given storage request.

37. The method of claim 25, further comprising translating storage communications between the storage protocol of the storage stack and a transport protocol provided by the virtual fabric.

38. The method of claim 25, wherein the storage protocol is a block storage protocol.

39. The method of claim 25, further comprising logging in to the external SAN fabric by the second virtual machine to expose the virtual storage target to the external SAN fabric.

* * * * *